(12) United States Patent
Guo et al.

(10) Patent No.: US 10,901,293 B1
(45) Date of Patent: Jan. 26, 2021

(54) TWO-DIMENSIONAL OPTICAL PHASED ARRAY

(71) Applicants: Huazhong University of Science and Technology, Wuhan (CN); Weihua Guo, Wuhan (CN)

(72) Inventors: Weihua Guo, Wuhan (CN); Su Tan, Wuhan (CN); Qiaoyin Lu, Wuhan (CN)

(73) Assignees: HUAZHONG UNIVERSITY OF SCIENCE AND TECHNOLOGY, Wuhan (CN); Weihua Guo, Wuhan (CN)

( * ) Notice: Subject to any disclaimer, the term of this patent is extended or adjusted under 35 U.S.C. 154(b) by 0 days.

(21) Appl. No.: 16/730,972

(22) Filed: Dec. 30, 2019

(30) Foreign Application Priority Data

Aug. 7, 2019 (CN) .......................... 2019 1 0725179

(51) Int. Cl.
| | |
|---|---|
| *G02B 27/00* | (2006.01) |
| *G02F 1/295* | (2006.01) |
| *G02B 27/09* | (2006.01) |
| *G02B 6/10* | (2006.01) |
| *G02B 3/00* | (2006.01) |
| *G02F 1/01* | (2006.01) |

(52) U.S. Cl.
CPC ............. *G02F 1/2955* (2013.01); *G02B 6/10* (2013.01); *G02B 27/0087* (2013.01); *G02B 27/0938* (2013.01); *G02B 3/0056* (2013.01); *G02F 1/0147* (2013.01)

(58) Field of Classification Search
None
See application file for complete search history.

(56) References Cited

U.S. PATENT DOCUMENTS

| | | | | |
|---|---|---|---|---|
| 3,331,651 | A * | 7/1967 | Sterzer | .................... G02F 1/292 359/315 |
| 5,151,814 | A * | 9/1992 | Grinberg | ............ G02B 27/0087 349/202 |
| 5,233,673 | A * | 8/1993 | Vali | .......................... G01S 7/48 385/14 |
| 5,751,248 | A * | 5/1998 | Thaniyavarn | ........ H01Q 3/2676 342/368 |
| 5,943,159 | A * | 8/1999 | Zhu | ........................ G02F 1/292 359/254 |
| 2017/0255077 | A1 * | 9/2017 | Pruessner | ............. G01S 7/4813 |
| 2019/0235233 | A1 * | 8/2019 | Russo | ................ G02B 27/0068 |

\* cited by examiner

*Primary Examiner* — Michael Stahl
(74) *Attorney, Agent, or Firm* — Matthias Scholl P.C.; Matthias Scholl (57) ABSTRACT

A two-dimensional optical phased array, including a first phased array and a second phased array disposed on the first phased array. The first phased array includes an optical coupler, a beam splitter, a plurality of phase shifters, and a plurality of light-emitting units. The second phased array includes a strip transparent electrode array, a phase shifting medium, and a transparent electrode disposed on the phase shifting medium. The strip transparent electrode array is disposed on the light-emitting units. The phase shifting medium is disposed on the strip transparent electrode array. The light-emitting units is configured to produce a laser beam which is incident to the second phased array via the strip transparent electrode array and emitted via the transparent electrode on the phase shifting medium.

4 Claims, 7 Drawing Sheets

TWO-DIMENSIONAL OPTICAL PHASED ARRAY

CROSS-REFERENCE TO RELATED APPLICATIONS

Pursuant to 35 U.S.C.§ 119 and the Paris Convention Treaty, this application claims foreign priority to Chinese Patent Application No. 201910725179.X filed Aug. 7, 2019, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to the technical field of optical phased arrays, and more particularly to a two-dimensional optical phased array.

Optical phased array is a beam deflection technology, which is programmed to realize phase control and then control the direction and shape of the beam, providing programmable beam deflection and scanning for lidars and other electro-optical sensors.

Conventionally, a two-dimensional optical phased array including M×N array elements requires M×N independent control units. This makes the array module bulky and inefficient as each array element is independently controlled.

SUMMARY

Provided is a two-dimensional optical phased array, which comprises a first phased array and a second phased array disposed on the first phased array. The first phased array comprises an optical coupler, a beam splitter, a plurality of phase shifters, and a plurality of light-emitting units; the second phased array comprises a strip transparent electrode array, a phase shifting medium, and a transparent electrode disposed on the phase shifting medium. The strip transparent electrode array is disposed on the plurality of light-emitting units; the phase shifting medium is disposed on the strip transparent electrode array. The plurality of light-emitting units is configured to produce a laser beam which is incident to the second phased array via the strip transparent electrode array and emitted to free-space via the transparent electrode on the phase shifting medium.

The external laser light is coupled into the first phased array by the optical coupler through vertical coupling or end-facet coupling.

The beam splitter is a cascaded multimode interferometer (MMI), a cascaded Y-branch coupler, or a star coupler.

Each of N optical waveguides is provided with an independent phase shifter; the phase shifter can independently control the phase of light waves in each of the optical waveguides through thermo-optic effect, electro-optic effect or other methods; each of the phase shifters has the ability of producing a a phase shift.

The plurality of light-emitting units is disposed on the optical waveguides. Specifically, M light-emitting units are disposed on each of the optical waveguides, and the $m^{th}$ light-emitting units on each of N optical waveguides are arranged in a straight line. In total, M×N light-emitting units are disposed, where M and N are integers.

The light-emitting unit can be an emitting grating, and the light wave in the optical waveguide can be emitted perpendicularly to the first phased array. When the light-emitting units are $2^{nd}$-order emitting gratings, the $2^{nd}$-order gratings period is $\Lambda=\lambda_B/n_{eff}$, where $\lambda_B$ refers to the Bragg wavelength, $n_{eff}$ refers to the effective refractive index of the waveguide.

The strip transparent electrode array is disposed on the light-emitting unit of the first phased array; the strip transparent electrode array comprises M strip transparent electrodes where M is an integer; the beam splitter split the laser beam into N optical waveguides where N is an integer; an $m^{th}$ strip transparent electrode of the M strip transparent electrodes covers all $m^{th}$ light-emitting units on the N optical waveguides of the first phased array. For example, the $3^{rd}$ strip transparent electrodes are disposed on all of the $3^{rd}$ light-emitting units on the N optical waveguide.

The strip transparent electrode array is covered with a layer of phase shifting medium. The phase shifting medium can be the liquid crystal or an electro-optic polymer, being configured to control the phase of the light wave.

The optical phased shifting medium is covered with a layer of the transparent electrode. The laser beam is emitted from the light-emitting units, passes through the strip transparent electrode, and is incident into the phase shifting medium. Thereafter, the laser beam passes through the phase shifting medium and the transparent electrode and is emitted.

When the transparent electrode on the phase shifting medium is grounded, changing the voltage applied on the strip transparent electrode can change the phase of the laser beam emitted from the light-emitting units. For example, after connecting the transparent electrode on the phase shifting medium to the ground, changing the voltage applied on the $4^{th}$ strip transparent electrode can simultaneously change the phase of the laser beams emitted from all the $4^{th}$ light-emitting units on the N waveguides.

The divergence angle of the main lobe and the suppression ratio of the side lobe of the laser beam in the far-field of the two-dimensional optical phased array can be optimized by adjusting the distance between the N optical waveguides and the distance between the M light-emitting units on each optical waveguide.

When the transparent electrode on the phase shifting medium is connected to the ground, controlling the N independent phase shifters and changing the voltage applied on M strip transparent electrode arrays can adjust the equiphase surface of the laser beams emitted from the N×M light-emitting units to be a plane.

When the transparent electrode on the phase shifting medium is connected to the ground, controlling the N independent phase shifters and changing the voltage applied on M strip transparent electrode arrays can two-dimensionally deflect the equiphase surface of the laser beams, thus achieving the scanning of the laser beams.

DETAILED DESCRIPTIONS

Figure 1:
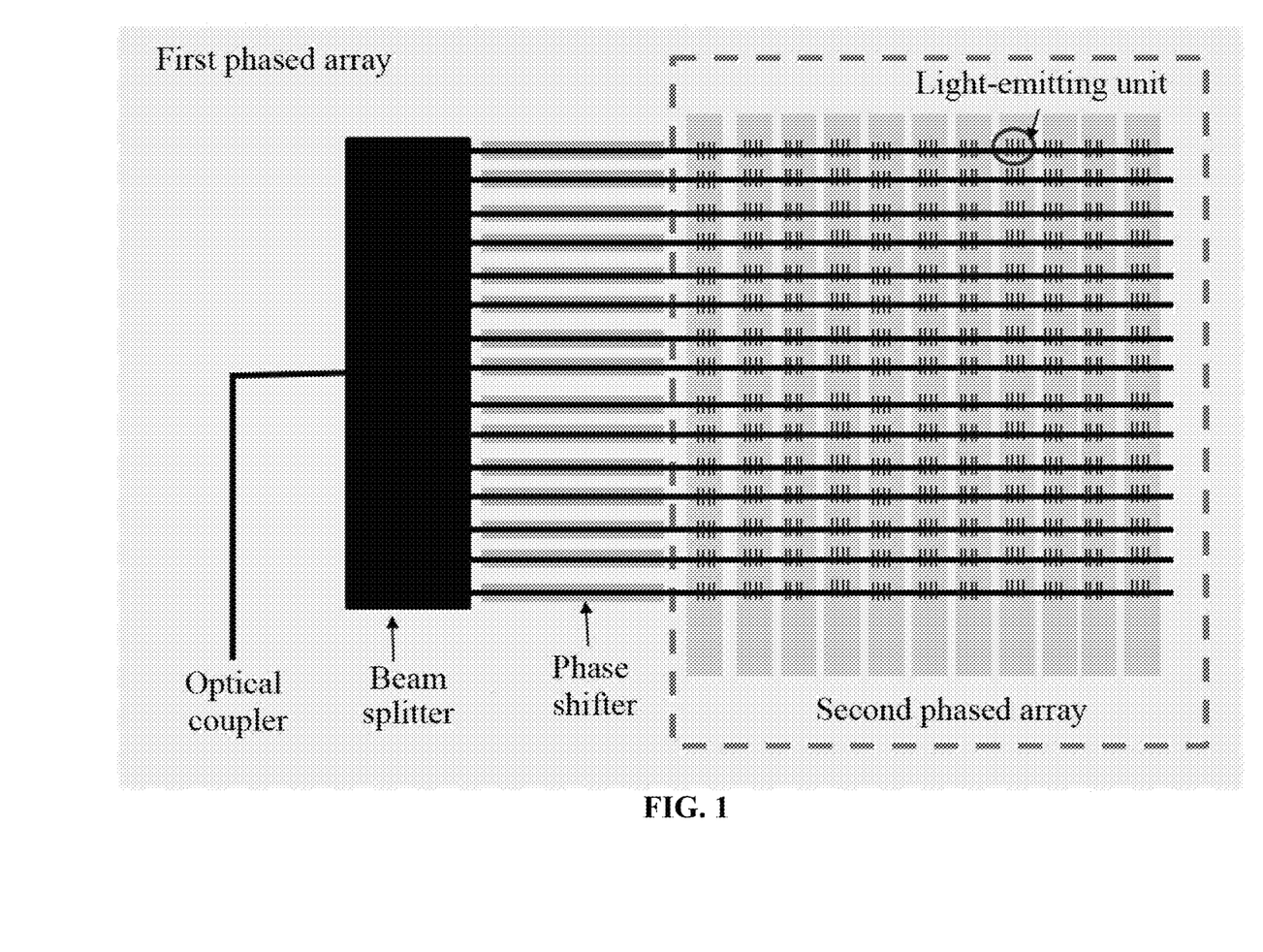
FIG. 1 is a schematic diagram of a two-dimensional optical phased array according to one embodiment of the disclosure.

The disclosure provides a two-dimensional optical phased array as shown in FIG. 1. The two-dimensional optical phased array comprises a first phased array and a second phased array. The first phased array comprises an optical coupler, a beam splitter, a plurality of phase shifters, and a plurality of light-emitting units. The optical coupler couples the laser light emitted by the external laser into a first phased array by means of vertical coupling (such as coupling gratings) or end-facet coupling; the beam splitter can be a cascaded multimode interferometer (MMI), a cascaded Y-branch coupler, or a star coupler; the beam splitter is capable of splitting the light wave into the N optical waveguides; each of N optical waveguides has an independent phase shifter; the phase shifter can independently control the phase of light waves in each of the optical waveguides by using the thermo-optic effect, electro-optic effect or other methods. Each optical waveguide has M segments of the light-emitting units, and the light-emitting units (such as emitting gratings) can vertically incident the light from the optical waveguide of the first phased array into the second phased array above the first phased array.

Figure 2:
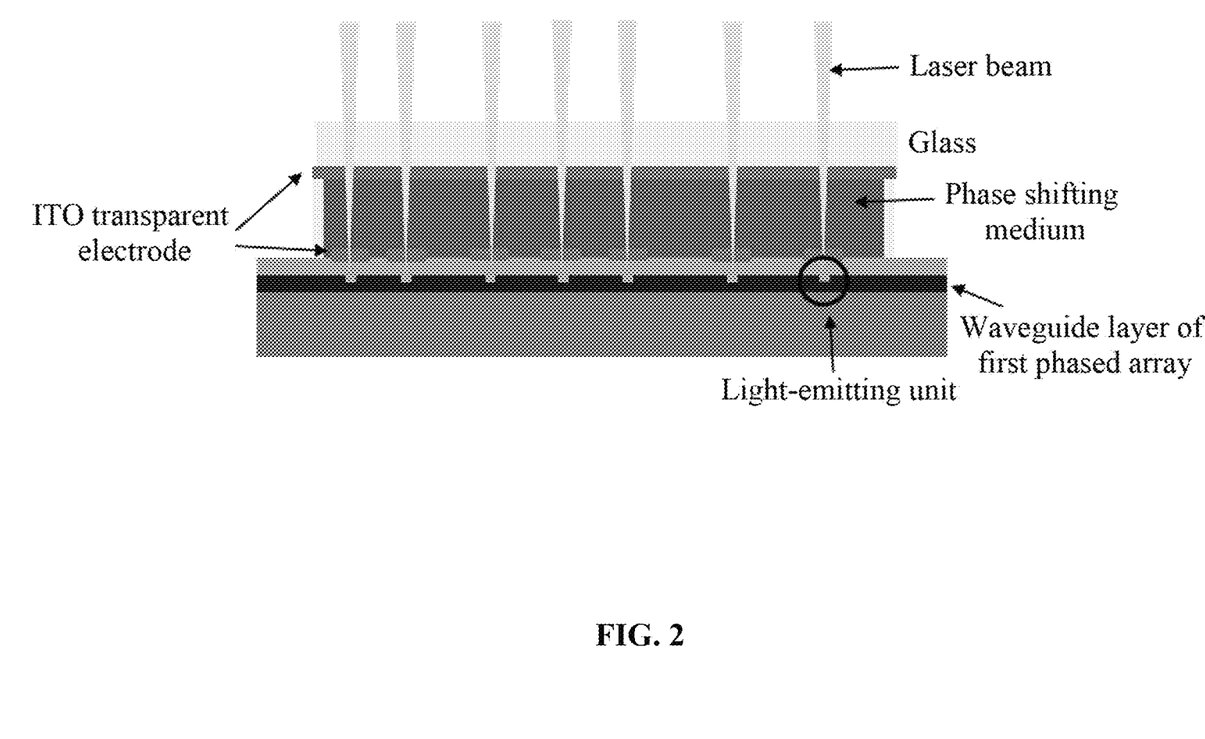
FIG. 2 is a cross section (in the direction of the optical waveguide) of a two-dimensional optical phased array according to one embodiment of the disclosure.
Figure 3:
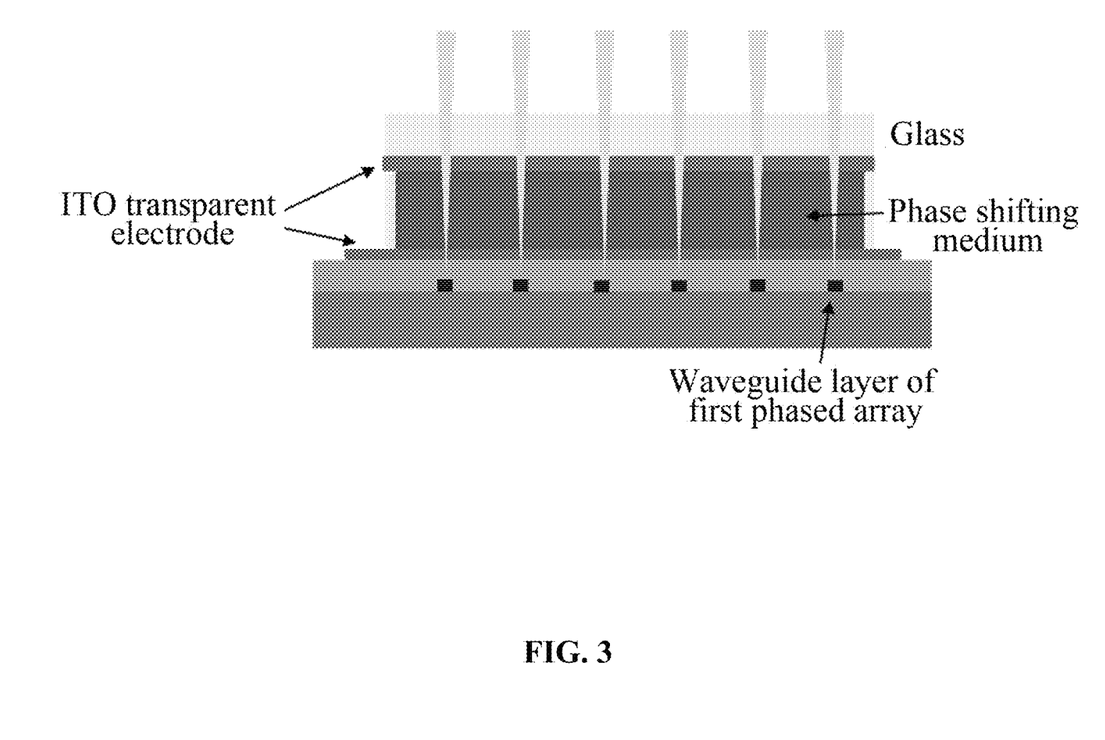
FIG. 3 is a cross section (perpendicular to the direction of optical waveguide) of a two-dimensional optical phased array according to one embodiment of the disclosure.

FIG. 2 is a sectional view (in the direction of optical waveguide) of the second phased array, and FIG. 3 is a sectional view (perpendicular to the direction of optical waveguide) of the second phased array. The first phased array is vertically covered with the second phased array. The second phased array comprises a strip transparent electrode array, a phase shifting medium and a transparent electrode on the phase shifting medium. The light-emitting units of the first phased array are covered with strip transparent electrode array. All of the $m^{th}$ segment of the light-emitting units on the N optical waveguides of the first phased array is covered with the $m^{th}$ strip transparent electrode array. There is a total of M strip transparent electrode arrays. The phase shifting medium can be the liquid crystal or an electro-optic polymer, which are the medium capable of controlling the phase of the light wave. The phase shifting medium is covered with a transparent electrode and a layer of glass in sequence. The voltage applied between the strip transparent electrode array covering a light-emitting unit and the transparent electrode on the phase shifting medium, can independently control the phase of the laser beam that incidents from the light-emitting unit on the first phased array into the phase shifting medium; The laser beam is eventually emitted through the transparent electrode covering the phase shifting medium.

The principle of the laser beam scanning of the optical phased array: adjusting the equiphase surface of the laser beam ejected from all of light-emitting units to be a plane by regulating each of the phased units. The laser beams emitted by each of light-emitting units in the direction indicated by the normal vector of the equiphase surface are in the same phase with each other, thus generating the mutually reinforcing interference. The results of the interference are to produce a branch of high-intensity laser beam in this direction, while the optical wave emitted by the each of phase-controlled units in other directions is not satisfied with the requirement of being in the same phase with each other. Therefore, optical wave cancels each other out in other directions. Changing the angle of the equiphase surface of the laser beam emitted by the optical phased array can realize the angular deflection of laser beam emitted by the optical phased array, further achieving the laser beam scanning.

The necessary and sufficient conditions for realizing the laser beam scanning by the optical phased array chips are to ensure that the equiphase surface of the outgoing beam emitted by all of the light-emitting units is a plane, and the deflection of the normal vector of the equiphase surface is under the control. Therefore, a detailed description of phased modulation method for two-dimensional optical phased array provided by the disclosure, is described to prove that the optical phased array is capable of realizing the two-dimensional laser beam scanning.

FIG. 1 shows the structure of a two-dimensional optical phased array according to one embodiment of the disclosure. A phase shifter in the first phased array can adjust the phase of the laser beam emitted by all of the light-emitting units in the same optical waveguide. The strip transparent electrode can apply the same phase for the laser beam emitted by the light-emitting units covered with this transparent electrode.

Figure 4:
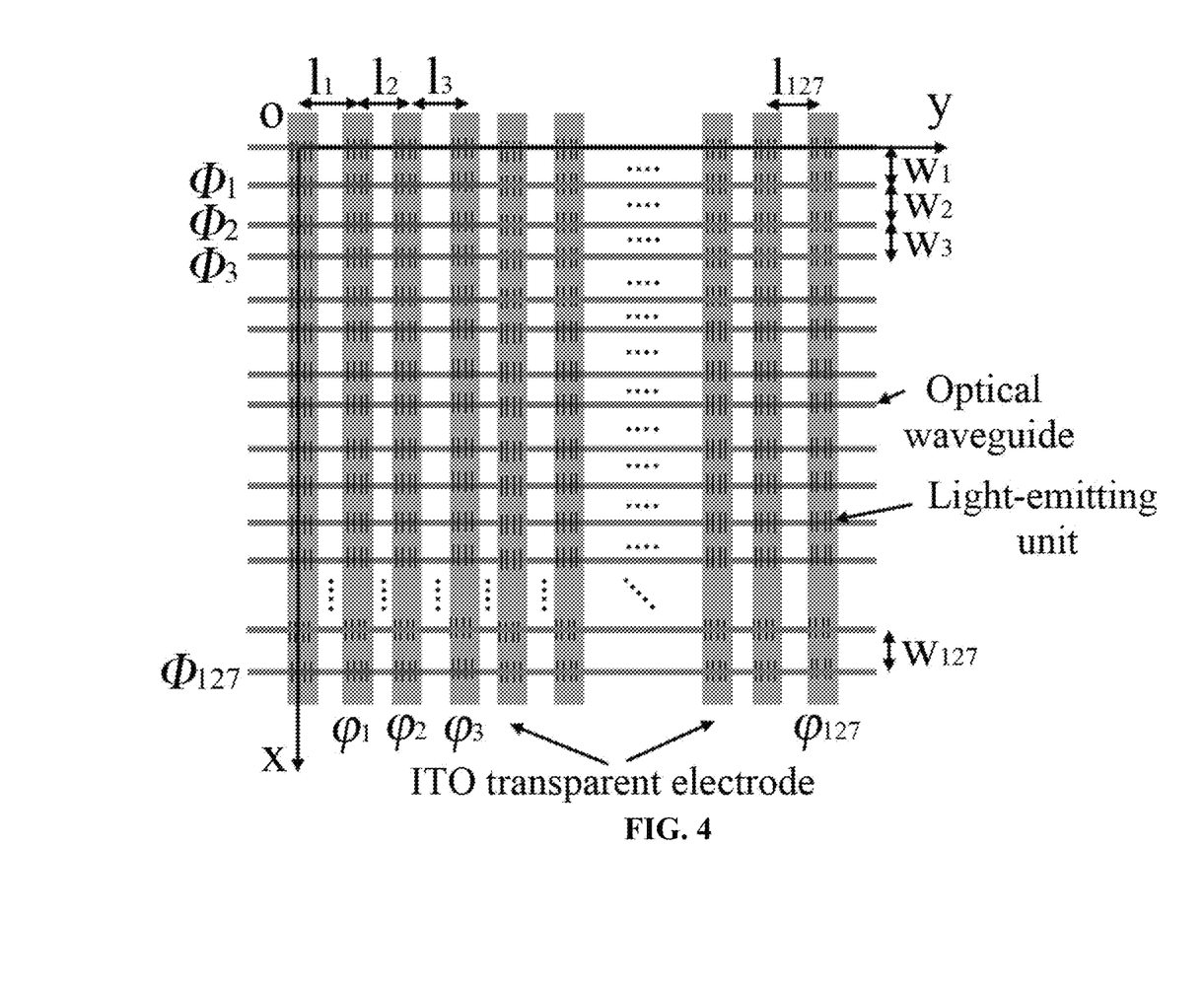
FIG. 4 is an arrangement diagram of an array of the light-emitting units according to one embodiment of the disclosure.

FIG. 4 shows the arrangement diagram of an array of the light-emitting units according to one embodiment of the disclosure. The light-emitting units in the upper left corner as a coordinate origin, and the straight line passing through the first row of the light-emitting units as the y-axis, and the straight line passing through the first column of the light-emitting units as the x-axis, are used to construct a rectangular coordinate system. For better description, it is assumed that there are 128 rows×128 columns of light-emitting units, where the spacing between the adjacent light-emitting units in the same row are denoted as $l_1, l_2, l_3 \ldots l_{127}$, respectively, and the spacing between the adjacent light-emitting units in the same column are denoted as $w_1, w_2, w_3 \ldots w_{127}$, respectively. Reference is made to the phase of the light-emitting unit at the most top left corner (the phase is 0). The initial phase (controlled by phase shifter on the first phase array) of the $2^{nd}$ optical waveguide to the $128^{th}$ optical waveguide relative to the $1^{st}$ optical waveguide is denoted as $\phi_1, \phi_2, \phi_3 \ldots \phi_{127}$, respectively. The phase shift generated by the same column of light-emitting units in the phase shifting medium, can be adjusted by the voltage which is applied between the transparent electrode disposed on the same column of optical light-emitting units and the other transparent electrode disposed on the phase shifting medium. The longitudinal distances from the same column of the light-emitting units to the corresponding first column of light-emitting units are the same. Therefore, the phase shift caused by the optical waveguide transmission is the same as regard to the same column of the light-emitting units. The additional phase (including the phase shift caused by the waveguide transmission and the phase shifting medium) of the 2nd column to the $128^{th}$ column of the light-emitting relative to the $1^{st}$ column of the light-emitting units are denoted as $\varphi_1, \varphi_2, \varphi_3 \ldots \varphi_{127}$, respectively. On the basis of FIG. 4, a Z-axis perpendicular to the X-Y plane is formed through the 0 point, and a 3D rectangular coordinate system is established, wherein the units of the X-axis and Y-axis are distances, and the unit of the Z-axis is phase. Therefore, The coordinates of the $(m+1)^{th}$ row and the $(n+1)^{th}$ column of the light-emitting unit in the 3D rectangular coordinate system are $(w_1+w_2+w_3+ \ldots \pm w_m, l_1+l_2+l_{3+} \ldots +l_n, \varphi_n+\phi_m)$.

For the laser beam in the far-field, the main lobes refer to the wave lobes having the preset angle in the far-field, and the side lobes refers to the residual wave lobes except the main lobes. The side lobes are in the middle position of constructive interference and destructive interference. Under normal circumstances, their luminous intensity is weaker than that of the main lobes. The side lobes are typically divided into two types including side lobes and grating lobes. The side lobes corresponding to a sub-maximum value, generally has a relative low level of luminous intensity, which has little effects on the main lobes. However, the grating lobes corresponds to a high order principal maximum value, that is, the laser beams outside the main lobes form a maximum value through the constructive interference in the other directions, resulting in a great influence on the scanning of the main lobes. Therefore, the suppression of the side lobes is generally also called the suppression of the grating lobes which refers to the compression or the removal of the grating lobes. SLSR (Side Lobe Suppression Ratio) is used for depicting the intensity difference between the maximum grating lobes and the main lobes, and also depicting the suppression ability of the side lobes in an array at the same time.

The relative strong grating lobes will occur in the far-field direction of the optical phased array $(d>\lambda/2)$ with uniform spacing. The periodic structure occurs due to the constant spacing d of the adjacent array elements, and thus resulting in the appearance of the grating lobes in the far-field. However, the optical phased array with non-uniform spacing just breaks the periodic structure existed in the uniform arrays, in which those grating lobes that originally form constructive interference as long as satisfying the relationship of the same phase, at this time, are not all of laser beams that can satisfy the relationship of the same phase. Therefore, it is possible to suppress the formed grating lobes and weaken the luminous intensity there.

The disclosure can achieve a relative high side lobe suppression ratio in the far-field by the light-emitting units with non-uniform arrangement. A two-dimensional optical phased array having M=N=128 of non-uniform arrangement in the light-emitting units is taken as an example, to simulate and analyze its laser beam in the far-field. FIG. 3 shows the light-emitting unit array of a two-dimensional optical phased array. It is assumed that the optical phased array has 128× 128 light-emitting units. The optical field distribution in the far-field can be obtained from the laser beams in the near-field by using Fourier transform according to the Fourier optics. After the optimization, the arrangement for the light-emitting units of a 128×128 two-dimensional optical phased array is shown as Table 1 (the units of $l_n$ and $w_m$ are μm):

TABLE 1

Arrangement for light-emitting units of a 128 × 128 two-dimensional optical phased array

| | | | | | | | | | |
|---|---|---|---|---|---|---|---|---|---|
| $l_1$ | 2.085806 | $l_2$ | 9.728968 | $l_3$ | 9.294604 | $l_4$ | 6.015746 | $l_5$ | 7.951871 |
| $l_6$ | 6.625592 | $l_7$ | 6.648686 | $l_8$ | 4.993016 | $l_9$ | 7.357327 | $l_{10}$ | 4.305793 |
| $l_{11}$ | 9.719945 | $l_{12}$ | 5.273251 | $l_{13}$ | 8.535284 | $l_{14}$ | 7.616713 | $l_{15}$ | 5.598936 |
| $l_{16}$ | 4.592431 | $l_{17}$ | 4.160509 | $l_{18}$ | 7.420262 | $l_{19}$ | 5.510151 | $l_{20}$ | 4.030681 |
| $l_{21}$ | 8.965806 | $l_{22}$ | 5.36368 | $l_{23}$ | 7.468129 | $l_{24}$ | 7.657491 | $l_{25}$ | 9.244065 |
| $l_{26}$ | 9.361257 | $l_{27}$ | 8.487136 | $l_{28}$ | 8.997395 | $l_{29}$ | 6.131676 | $l_{30}$ | 4.692521 |
| $l_{31}$ | 5.663695 | $l_{32}$ | 7.119764 | $l_{33}$ | 7.927269 | $l_{34}$ | 6.697377 | $l_{35}$ | 9.02958 |
| $l_{36}$ | 7.018411 | $l_{37}$ | 7.443339 | $l_{38}$ | 6.714041 | $l_{39}$ | 4.113485 | $l_{40}$ | 5.15587 |
| $l_{41}$ | 6.217211 | $l_{42}$ | 4.781844 | $l_{43}$ | 8.285734 | $l_{44}$ | 4.263069 | $l_{45}$ | 4.962375 |
| $l_{46}$ | 7.012975 | $l_{47}$ | 8.797651 | $l_{48}$ | 6.967134 | $l_{49}$ | 7.026487 | $l_{50}$ | 5.807932 |
| $l_{51}$ | 8.519659 | $l_{52}$ | 4.886138 | $l_{53}$ | 5.591995 | $l_{54}$ | 4.086785 | $l_{55}$ | 6.488453 |
| $l_{56}$ | 6.332608 | $l_{57}$ | 7.174281 | $l_{58}$ | 7.989315 | $l_{59}$ | 8.251191 | $l_{60}$ | 9.67398 |
| $l_{61}$ | 4.653517 | $l_{62}$ | 4.607981 | $l_{63}$ | 9.504768 | $l_{64}$ | 9.941301 | $l_{65}$ | 9.169343 |
| $l_{66}$ | 5.252414 | $l_{67}$ | 7.059583 | $l_{68}$ | 9.543937 | $l_{69}$ | 8.721598 | $l_{70}$ | 4.492353 |
| $l_{71}$ | 5.751755 | $l_{72}$ | 6.096502 | $l_{73}$ | 7.56964 | $l_{74}$ | 7.939691 | $l_{75}$ | 7.473311 |
| $l_{76}$ | 5.91236 | $l_{77}$ | 8.818906 | $l_{78}$ | 6.820072 | $l_{79}$ | 9.913153 | $l_{80}$ | 8.058798 |
| $l_{81}$ | 8.143255 | $l_{82}$ | 9.044997 | $l_{83}$ | 6.539668 | $l_{84}$ | 5.410332 | $l_{85}$ | 9.692065 |
| $l_{86}$ | 9.976562 | $l_{87}$ | 9.668666 | $l_{88}$ | 8.805197 | $l_{89}$ | 8.153237 | $l_{90}$ | 4.783313 |
| $l_{91}$ | 4.989005 | $l_{92}$ | 9.866601 | $l_{93}$ | 6.909898 | $l_{94}$ | 9.710172 | $l_{95}$ | 7.525887 |
| $l_{96}$ | 7.676076 | $l_{97}$ | 4.998606 | $l_{98}$ | 7.013733 | $l_{99}$ | 6.417011 | $l_{100}$ | 6.994082 |
| $l_{101}$ | 9.309203 | $l_{102}$ | 7.965489 | $l_{103}$ | 5.236579 | $l_{104}$ | 7.698369 | $l_{105}$ | 6.562138 |
| $l_{106}$ | 9.041159 | $l_{107}$ | 5.05261 | $l_{108}$ | 8.647093 | $l_{109}$ | 9.343323 | $l_{110}$ | 5.88058 |
| $l_{111}$ | 7.828528 | $l_{112}$ | 7.6022 | $l_{113}$ | 5.063934 | $l_{114}$ | 7.167116 | $l_{115}$ | 4.055628 |
| $l_{116}$ | 9.981262 | $l_{117}$ | 5.459326 | $l_{118}$ | 4.244557 | $l_{119}$ | 4.776985 | $l_{120}$ | 5.562709 |
| $l_{121}$ | 9.33506 | $l_{122}$ | 9.54475 | $l_{123}$ | 4.784946 | $l_{124}$ | 5.835623 | $l_{125}$ | 7.668373 |
| $l_{126}$ | 4.753094 | $l_{127}$ | 9.104237 | | | | | | |
| $w_1$ | 2.085806 | $w_2$ | 9.728968 | $w_3$ | 9.294604 | $w_4$ | 6.015746 | $w_5$ | 7.951871 |
| $w_6$ | 6.625592 | $w_7$ | 6.648686 | $w_8$ | 4.993016 | $w_9$ | 7.357327 | $w_{10}$ | 4.305793 |
| $w_{11}$ | 9.719945 | $w_{12}$ | 5.273251 | $w_{13}$ | 8.535284 | $w_{14}$ | 7.616713 | $w_{15}$ | 5.598936 |
| $w_{16}$ | 4.592431 | $w_{17}$ | 4.160509 | $w_{18}$ | 7.420262 | $w_{19}$ | 5.510151 | $w_{20}$ | 4.030681 |
| $w_{21}$ | 8.965806 | $w_{22}$ | 5.36368 | $w_{23}$ | 7.468129 | $w_{24}$ | 7.657491 | $w_{25}$ | 9.244065 |
| $w_{26}$ | 9.361257 | $w_{27}$ | 8.487136 | $w_{28}$ | 8.997395 | $w_{29}$ | 6.131676 | $w_{30}$ | 4.692521 |
| $w_{31}$ | 5.663695 | $w_{32}$ | 7.119764 | $w_{33}$ | 7.927269 | $w_{34}$ | 6.697377 | $w_{35}$ | 9.02958 |
| $w_{36}$ | 7.018411 | $w_{37}$ | 7.443339 | $w_{38}$ | 6.714041 | $w_{39}$ | 4.113485 | $w_{40}$ | 5.15587 |
| $w_{41}$ | 6.217211 | $w_{42}$ | 4.781844 | $w_{43}$ | 8.285734 | $w_{44}$ | 4.263069 | $w_{45}$ | 4.962375 |
| $w_{46}$ | 7.012975 | $w_{47}$ | 8.797651 | $w_{48}$ | 6.967134 | $w_{49}$ | 7.026487 | $w_{50}$ | 5.807932 |
| $w_{51}$ | 8.519659 | $w_{52}$ | 4.886138 | $w_{53}$ | 5.591995 | $w_{54}$ | 4.086785 | $w_{55}$ | 6.488453 |
| $w_{56}$ | 6.332608 | $w_{57}$ | 7.174281 | $w_{58}$ | 7.989315 | $w_{59}$ | 8.251191 | $w_{60}$ | 9.67398 |
| $w_{61}$ | 4.653517 | $w_{62}$ | 4.607981 | $w_{63}$ | 9.504768 | $w_{64}$ | 9.941301 | $w_{65}$ | 9.169343 |
| $w_{66}$ | 5.252414 | $w_{67}$ | 7.059583 | $w_{68}$ | 9.543937 | $w_{69}$ | 8.721598 | $w_{70}$ | 4.492353 |

TABLE 1-continued

Arrangement for light-emitting units of a 128 × 128 two-dimensional optical phased array

| | | | | | | | | | |
|---|---|---|---|---|---|---|---|---|---|
| $w_{71}$ | 5.751755 | $w_{72}$ | 6.096502 | $w_{73}$ | 7.56964 | $w_{74}$ | 7.939691 | $w_{75}$ | 7.473311 |
| $w_{76}$ | 5.91236 | $w_{77}$ | 8.818906 | $w_{78}$ | 6.820072 | $w_{79}$ | 9.913153 | $w_{80}$ | 8.058798 |
| $w_{81}$ | 8.143255 | $w_{82}$ | 9.044997 | $w_{83}$ | 6.539668 | $w_{84}$ | 5.410332 | $w_{85}$ | 9.692065 |
| $w_{86}$ | 9.976562 | $w_{87}$ | 9.668666 | $w_{88}$ | 8.805197 | $w_{89}$ | 8.153237 | $w_{90}$ | 4.783313 |
| $w_{91}$ | 4.989005 | $w_{92}$ | 9.866601 | $w_{93}$ | 6.909898 | $w_{94}$ | 9.710172 | $w_{95}$ | 7.525887 |
| $w_{96}$ | 7.676076 | $w_{97}$ | 4.998606 | $w_{98}$ | 7.013733 | $w_{99}$ | 6.417011 | $w_{100}$ | 6.994082 |
| $w_{101}$ | 9.309203 | $w_{102}$ | 7.965489 | $w_{103}$ | 5.236579 | $w_{104}$ | 7.698369 | $w_{105}$ | 6.562138 |
| $w_{106}$ | 9.041159 | $w_{107}$ | 5.05261 | $w_{108}$ | 8.647093 | $w_{109}$ | 9.343323 | $w_{110}$ | 5.88058 |
| $w_{111}$ | 7.828528 | $w_{112}$ | 7.6022 | $w_{113}$ | 5.063934 | $w_{114}$ | 7.167116 | $w_{115}$ | 4.055628 |
| $w_{116}$ | 9.981262 | $w_{117}$ | 5.459326 | $w_{118}$ | 4.244557 | $w_{119}$ | 4.776985 | $w_{120}$ | 5.562709 |
| $w_{121}$ | 9.33506 | $w_{122}$ | 9.54475 | $w_{123}$ | 4.784946 | $w_{124}$ | 5.835623 | $w_{125}$ | 7.668373 |
| $w_{126}$ | 4.753094 | $w_{127}$ | 9.104237 | $w_{128}$ | 8.592602 | | | | |

According to the principle of laser beam scanning in the optical phased array, it can be seen that when the equiphase surface of the laser beam emitted by the 128×128 light-emitting units is a plane, all of the light-emitting units in the optical phased array can realize the same phase in a preset direction, that is, the beam deflection in a given direction is realized.

When the equiphase surface of the laser beam emitted by the 128×128 light-emitting units is a plane (passing through the coordinate origin), the equiphase surface in the above-mentioned 3D rectangular coordinate system is based on the formula as below:

$$Ax+By+Cz=0 \quad (1)$$

For the plane equiphase surface formula in (1), the phase shifter in the first phased array and the voltage applied between the strip transparent electrode array covering a light-emitting unit and the transparent electrode on the phase shifting medium, can be adjusted for the adjacent φ and ϕ of the light-emitting array in FIG. 4 to meet the requirement of:

$$\begin{cases} \varphi_n - \varphi_{n-1} = -Bl_n/C \\ \phi_m - \phi_{m-1} = -Aw_n/C \end{cases} \quad (2)$$

then φ and ϕ meet the requirement of:

$$\begin{cases} \varphi_n = -B(l_1+l_2+l_3+\ldots+l_n)/C \\ \phi_m = -A(w_1+w_2+w_3+\ldots+w_m)/C \end{cases} \quad (3)$$

Two light-emitting units, Q and P, are randomly selecting from FIG. 4, wherein Q is the $(i+1)^{th}$ row and $(j+1)^{th}$ column of the light-emitting unit, and P is the $(p+1)^{th}$ row and $(q+1)^{th}$ column of the light-emitting unit (preferably p>i and q>j). The coordinates of the light-emitting units Q and P in the XYZ coordinate system are as follows:

$Q:(w_1+w_2+w_3+\ldots+w_i, l_1+l_2+l_3+\ldots+l_j, \varphi_j+\phi_i)$ $P:(w_1+w_2+w_3+\ldots+w_p, l_1+l_2+l_3+\ldots+l_q, \varphi_q+\phi_p)$ the coordinates of the light-emitting units Q and P, are substituted into the formula (3), and the coordinates of Q and P thus become as follows:

$Q:(w_1+\ldots+w_i, l_1+\ldots+l_j, -B(l_1+\ldots+l_j)/C-A(w_1+\ldots+w_i)/C)$ $P:(w_1+\ldots+w_p, l_1+\ldots+l_q, -B(l_1+\ldots+l_p)/C-A(w_1+\ldots+w_q)/C)$ then the vector $\overrightarrow{QP}$ is:

$$\overrightarrow{QP} = (w_i+\ldots+w_p, l_j+\ldots+l_q, -B(l_j+\ldots+l_p)/C-A(w_i+\ldots+w_q)/C)$$

the normal vector of the plane equiphase surface represented by the formula (1) is denoted as $\vec{K}$:

$$\vec{K} = (A,B,C)$$

then:

$$\vec{K} \cdot \overrightarrow{QP} = 0 \quad (4)$$

the formula (4) illustrates that the two random light-emitting units Q and P which is satisfied with the formula (3), both have the vectors $\overrightarrow{QP}$ perpendicular to the normal vector $\vec{K}$ of the plane equiphase surface as represented by the formula (1). Therefore, as shown in FIG. 4, the 3D coordinates of all of the light-emitting units in the light-emitting units array occurs on the plane equiphase surface as represented in the formula (1), that is, the equiphase surface of the laser beam emitted by all of the light-emitting units are the plane as shown in formula (1).

In summary, the phase shifter in the first phased array and the voltage applied between the strip transparent electrode array covering a light-emitting unit and the transparent electrode on the phase shifting medium, can be adjusted for the phase $\varphi_n+\phi_m$ of each of light-emitting array to meet the requirement of the formula (3). Therefore, the two-dimensional optical phased array provided in the disclosure can ensure that the equiphase surface of the laser beam is a plane that is arbitrarily but not parallel to Z-axis, that is, the two-dimensional optical scanning can be realized in principle.

On the basis of Fourier optics theory, the simulation for the far-field of the 128×128 two-dimensional optical phased array is as follows:

By neglecting the size of light-emitting region of the light-emitting units, the light-emitting units can be represented by the two-dimensional impulse function $\delta(x-x_n, y-y_m)$, wherein $x_n$ and $y_m$ refer to X-coordinate and Y-coordinate of the light-emitting units mapping to the coordinate system in FIG. 3, respectively. That is, the light-emitting unit has a luminous intensity of 1 at $(x_n, y_m)$ and has a luminous intensity of 0 in the other regions.

According to the Fourier optics, the complex amplitude distributions of the laser beam far-field in the direction of θ (θ is the horizontal angle) and ψ (ψ is the vertical angle) are as follows:

$$\tilde{E}(\theta, \psi) = \sum_{m,n} \exp(-i(kx_n \sin\theta + ky_m \sin\psi + k*\text{phase}(m,n))) \quad (5)$$

In the formula (5), $x_m$ and $y_n$ refer to the X-axis and Y-axis of the $m^{th}$ row and $n^{th}$ column of the light-emitting units in the coordinate system, as shown in FIG. 3. That is, $$x_n = \sum_{i=1}^{n} l_i, \quad y_m = \sum_{i=1}^{m} w_i,$$

and phase (m, n) is the phase of the light-emitting unit, that is, $\varphi_n + \phi_m$, $k = 2\pi/\lambda$.

Figure 5:
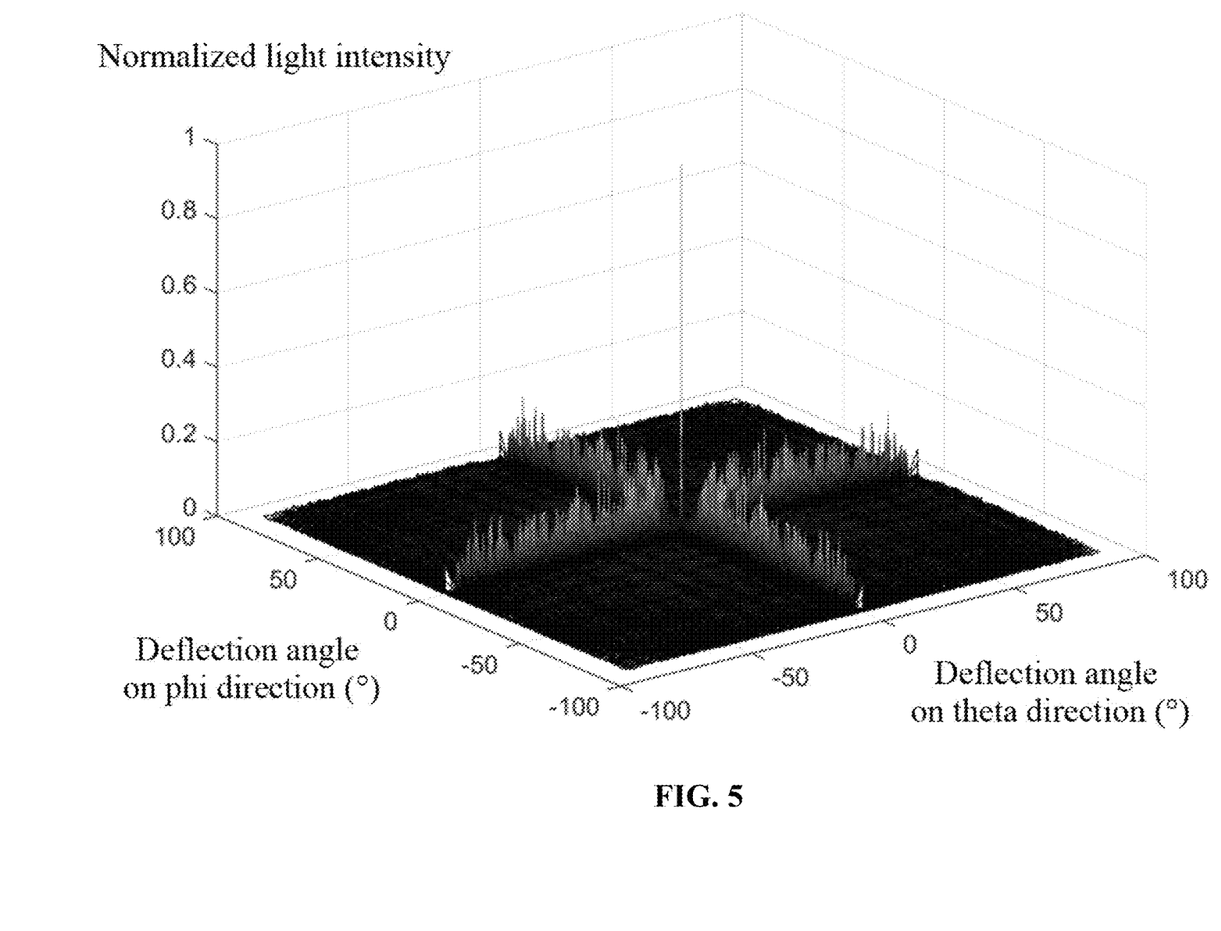
FIG. 5 is a simulation diagram of normalized complex amplitude distributions in the far-field when the deflection angle of the laser beam is 0°.

When phase (m, n)=0, that is, when the phase of all of the light-emitting units is 0, it corresponds to A=B=C=0 in the formula (1), that is, the equiphase surface of the laser beam is a plane and parallel to the X-Y plane. According to the formula (5), the normalized complex amplitude distribution of the laser beam in the far-field of 128×128 two-dimensional optical phased array is calculated and shown in the FIG. 5. At the same time, the equiphase surface of the laser beam is parallel to the X-Y plane. And in the far-field, the deflection angles of the laser beam in the direction of θ and ψ are 0°. At this time, within the laser beam of range of −90°≤θ and ψ≤90°, and the SLSR is about 15 dB.

Figure 6:
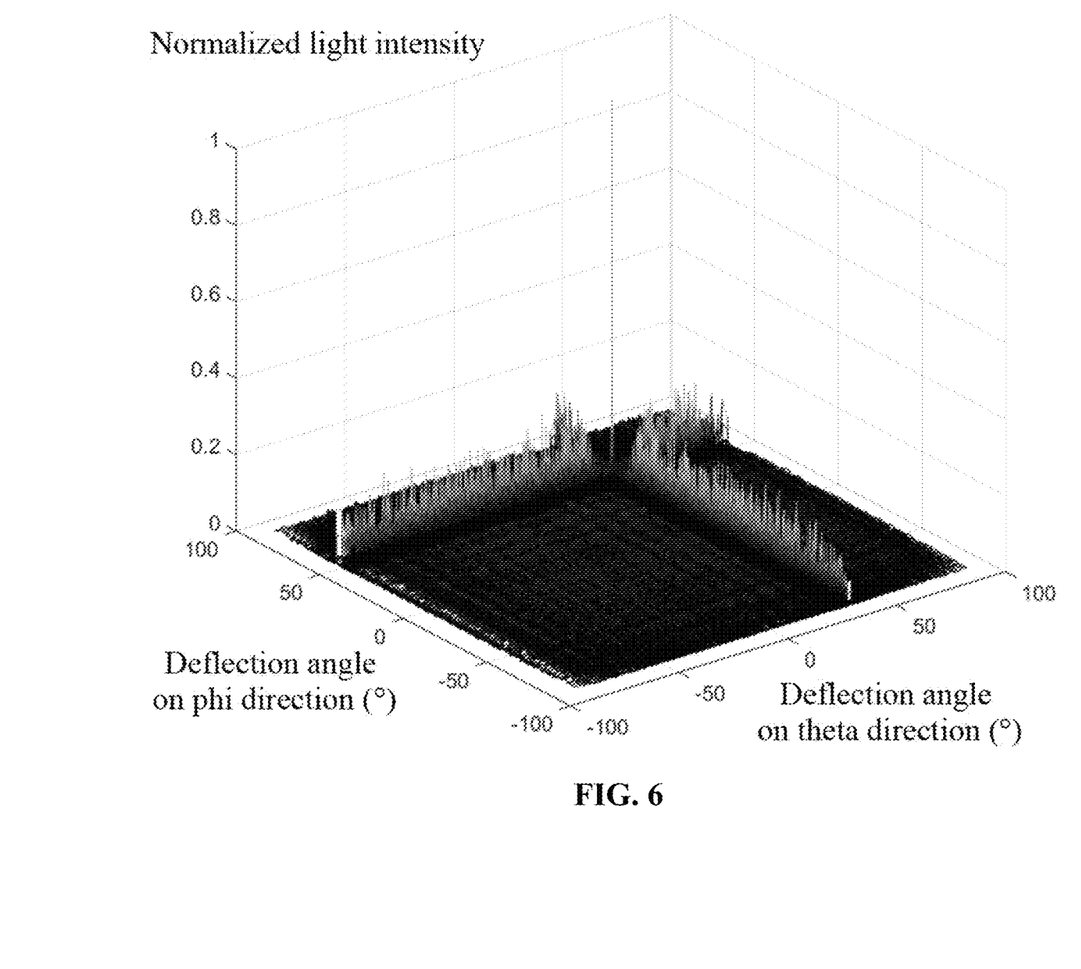
FIG. 6 is a simulation diagram of normalized complex amplitude distributions in the far-field when the deflection angle of the laser beam in two dimensions are 38.86 and 53.13, respectively.

The formula (3) is substituted into the formula (5), that is, the complex amplitude distribution of the laser beam in the far-field in the direction of θ and ψ is:

$$\tilde{E}(\theta, \psi) = \sum_{m,n} \exp\left(-i\left(kx_n \sin\theta + ky_m \sin\psi - \frac{kBx_n}{C} - \frac{kAy_m}{C}\right)\right) \quad (6)$$

in the formula (6), when A=3, B=4, C=5, that is, the equiphase surface of the laser beam in principle is 3x+4y+5z=0. According to the formula (6), the complex amplitude distribution of the laser beam in the far-field can be obtained, and the normalized complex amplitude distribution of the laser beam in the far-field is shown in the FIG. 6. At this time, the deflection angles of the laser beam in the far-field in the direction of θ are 38.86° and ψ are 53.13°, respectively. And the SLSR is about 15 dB within the laser beam of the range of −90°≤θ and ψ≤90°.

Figure 7:
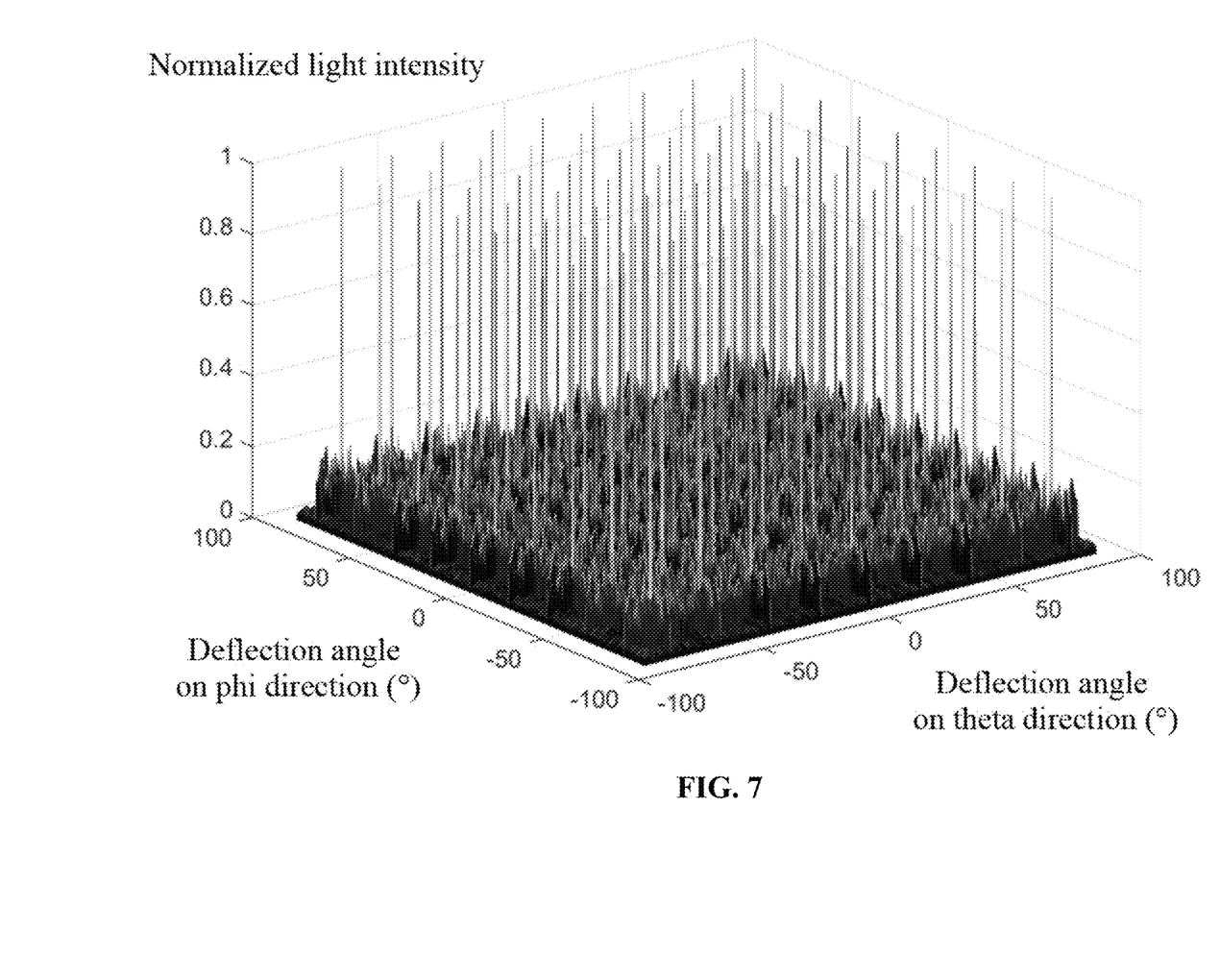
FIG. 7 is a superposed simulation diagram of normalized complex amplitude distributions in the far-field which are from 81 groups of deflection angles of different two-dimensional laser beam according to one embodiment of the disclosure.

By changing the values of A, B, C in the formula (6), 81 groups of complex amplitude distribution of the laser beam in the far-filed is simulated according to the formula (6). The superposition of the normalized complex amplitude distribution of the laser beam in the far-field is shown in FIG. 7, in which the deflection angles of 81 groups laser beam in the far-field in the direction of θ and ψ are shown in Table 2.

TABLE 2

| Deflection angles of 81 groups laser beam in the far-field in the direction of θ and ψ | |
|---|---|
| (θ, ψ) | (−80°, −80°) |
| (θ, ψ) | (−80°, −20°) |
| (θ, ψ) | (−80°, 40°) |
| (θ, ψ) | (−60°, −80°) |
| (θ, ψ) | (−60°, −20°) |
| (θ, ψ) | (−60°, 40°) |
| (θ, ψ) | (−40°, −80°) |
| (θ, ψ) | (−40°, −20°) |
| (θ, ψ) | (−40°, 40°) |
| (θ, ψ) | (−20°, −80°) |
| (θ, ψ) | (−20°, −20°) |
| (θ, ψ) | (−20°, 40°) |
| (θ, ψ) | (0°, −80°) |
| (θ, ψ) | (0°, −20°) |
| (θ, ψ) | (0°, 40°) |
| (θ, ψ) | (20°, −80°) |
| (θ, ψ) | (20°, −20°) |
| (θ, ψ) | (20°, 40°) |
| (θ, ψ) | (40°, −80°) |
| (θ, ψ) | (40°, −20°) |
| (θ, ψ) | (40°, 40°) |
| (θ, ψ) | (60°, −80°) |
| (θ, ψ) | (60°, −20°) |
| (θ, ψ) | (60°, 40°) |
| (θ, ψ) | (80°, −80°) |
| (θ, ψ) | (80°, −20°) |
| (θ, ψ) | (80°, 40°) |
| (θ, ψ) | (−80°, −60°) |
| (θ, ψ) | (−80°, 0°) |
| (θ, ψ) | (−80°, 60°) |
| (θ, ψ) | (−60°, −60°) |
| (θ, ψ) | (−60°, 0°) |
| (θ, ψ) | (−60°, 60°) |
| (θ, ψ) | (−40°, −60°) |
| (θ, ψ) | (−40°, 0°) |
| (θ, ψ) | (−40°, 60°) |
| (θ, ψ) | (−20°, −60°) |
| (θ, ψ) | (−20°, 0°) |
| (θ, ψ) | (−20°, 60°) |
| (θ, ψ) | (0°, −60°) |
| (θ, ψ) | (0°, 0°) |
| (θ, ψ) | (0°, 60°) |
| (θ, ψ) | (20°, −60°) |
| (θ, ψ) | (20°, 0°) |
| (θ, ψ) | (20°, 60°) |
| (θ, ψ) | (40°, −60°) |
| (θ, ψ) | (40°, 0°) |
| (θ, ψ) | (40°, 60°) |
| (θ, ψ) | (60°, −60°) |
| (θ, ψ) | (60°, 0°) |
| (θ, ψ) | (60°, 60°) |
| (θ, ψ) | (80°, −60°) |
| (θ, ψ) | (80°, 0°) |
| (θ, ψ) | (80°, 60°) |
| (θ, ψ) | (−80°, −40°) |
| (θ, ψ) | (−80°, 20°) |
| (θ, ψ) | (−80°, 80°) |
| (θ, ψ) | (−60°, −40°) |
| (θ, ψ) | (−60°, 20°) |
| (θ, ψ) | (−60°, 80°) |
| (θ, ψ) | (−40°, −40°) |
| (θ, ψ) | (−40°, 20°) |
| (θ, ψ) | (−40°, 80°) |
| (θ, ψ) | (−20°, −40°) |
| (θ, ψ) | (−20°, 20°) |
| (θ, ψ) | (−20°, 80°) |
| (θ, ψ) | (0°, −40°) |
| (θ, ψ) | (0°, 20°) |
| (θ, ψ) | (0°, 80°) |
| (θ, ψ) | (20°, −40°) |
| (θ, ψ) | (20°, 20°) |
| (θ, ψ) | (20°, 80°) |
| (θ, ψ) | (40°, −40°) |
| (θ, ψ) | (40°, 20°) |
| (θ, ψ) | (40°, 80°) |
| (θ, ψ) | (60°, −40°) |
| (θ, ψ) | (60°, 20°) |
| (θ, ψ) | (60°, 80°) |
| (θ, ψ) | (80°, −40°) |

TABLE 2-continued

Deflection angles of 81 groups laser beam in
the far-field in the direction of θ and ψ

| (θ, ψ) | (80°, 20°) |
| (θ, ψ) | (80°, 80°) |

As shown in FIG. 7, the 128×128 two-dimensional optical phased array is capable of ensuring that the deflection angles are greater than 160°, and the SLSR is about 15 dB in the range of −90°<θ and ψ≤90°.

In summary, the disclosure provides a two-dimensional optical phased array. The two-dimensional optical phased array comprises a first phased array and a second phased array. The first phased array comprises an optical coupler, a beam splitter, a plurality of phase shifters, and a plurality of light-emitting units. The second phased array comprises a strip transparent electrode array, a phase shifting medium and an electrode disposed on the phase shifting medium. The voltage applied between the strip transparent electrode array covering a light-emitting unit and the transparent electrode on the phase shifting medium, can independently control the phase of the laser beam that incidents from the light-emitting unit on the first phased array into the phase shifting medium; The laser beam is eventually emitted through the transparent electrode covering the phase shifting medium. The phase shifters in the first phased array and the voltage applied between the strip transparent electrode array covering light-emitting units and the transparent electrode on the phase shifting medium, can be adjusted to control the two-dimensional angle of the outgoing light.

By exhibiting far-field simulation results of a two-dimensional optical phased array based on a non-uniform arrangement of 128×128 light-emitting units, the two-dimensional optical phased array can realize the beam scanning of a SLSR greater than 15 dB within a range of −90°<θ, ψ≤90°, and the scanning range in both the θ and ψ dimensions is not less than 160°. It is proved that two-dimensional optical phased array is feasible, and appropriate beam deflection performance can be obtained.

The two-dimensional optical phased array has the following advantages.

1. The two-dimensional optical phased array can realize the two-dimensional laser beam scanning only by a single-wavelength laser light, and no need to use a tunable laser as light source, thus greatly reducing the costs of the two-dimensional laser beam scanning.

2. The two-dimensional optical phased array needs only M+N control units (refers to the phase shifters on the first phased array and the voltage applied between the first and the second electrodes of the phase shifting medium). Compared to the conventional two-dimensional phased array chips that needs M×N control units, the disclosure has the advantages of low cost and power consumption. The greater the M and N, the more obvious the advantages.

3. The disclosure can constitute a larger two-dimensional optical phased array only by juxtaposing a plurality of the small arrays. Therefore, the disclosure can realize a large-sized two-dimensional optical phased array.

Based on the above design principles of the disclosure, those skilled in the art can fully understand that the two-dimensional optical phased array of 128×128 light-emitting units provided by this example is merely an example, and do not limit the phase shifting mode of the phase shifter in the optical phased array, the number of optical waveguides, the number of light-emitting units, the arrangement of the light-emitting units, the selection of the phase shifting medium in the phased array of the phase shifting medium, and its phase shifting method.

It will be obvious to those skilled in the art that changes and modifications may be made, and therefore, the aim in the appended claims is to cover all such changes and modifications.

What is claimed is:

1. An optical phased array, comprising:
   a first phased array, the first phased array comprising an optical coupler, a beam splitter, a plurality of phase shifters, and a plurality of light-emitting units; and
   a second phased array disposed on the first phased array, the second phased array comprising a strip transparent electrode array, a phase shifting medium, and a transparent electrode;
   wherein:
   the strip transparent electrode array is disposed on the plurality of light-emitting units of the first phased array;
   the plurality of light-emitting units is configured to produce a laser beam which is incident to the second phased array via the strip transparent electrode array and emitted via the transparent electrode on the phase shifting medium; and
   the strip transparent electrode array comprises M strip transparent electrodes where M is an integer; the beam splitter splits the laser beam into N optical waveguides where N is an integer; an $m^{th}$ strip transparent electrode of the M strip transparent electrodes covers all $m^{th}$ light-emitting units on the N optical waveguides of the first phased array; the phase shifting medium is disposed on the strip transparent electrode array; the phase shifting medium is liquid crystal or an electro-optic polymer; and the phase shifting medium is covered by the transparent electrode.

2. The array of claim 1, wherein the optical coupler is configured to couple an external laser light into the first phased array; each of the N optical waveguides is equipped with an independent phase shifter to control the phase of an optical wave in each of the N optical waveguides; and each optical waveguide comprises M light-emitting units.

3. The array of claim 2, wherein the external laser light is coupled into the first phased array by the optical coupler through vertical coupling or end-face coupling.

4. The array of claim 3, wherein the beam splitter is a cascaded multimode interferometer (MMI), a cascaded Y-branch coupler, or a star coupler.

* * * * *